United States Patent Office 2,877,223
Patented Mar. 10, 1959

2,877,223

$\Delta^{8(14)}$-9,11-OXIDO AND $\Delta^{8(14),9(11)}$-ANDROSTENE DERIVATIVES

Eugene J. Agnello and Gerald D. Laubach, Jackson Heights, N. Y., assignors to Chas. Pfizer & Co., Inc., New York, N. Y., a corporation of Delaware No Drawing. Application September 4, 1958
Serial No. 758,917

7 Claims. (Cl. 260—239.55)

This application is concerned with new and useful steroid compounds and with compositions containing them. More particularly, it is concerned with certain $\Delta^{8(14),9(11)}$- and with 9β,11β-oxido-$\Delta^{8(14)}$-derivatives of androstene which are useful in the preparation of other androstene compounds. These other compounds are in turn useful as anabolic agents. They are described and claimed in copending and concurrently filed patent application Serial No. 758,919.

The useful compounds of this invention consist of those having the formulas

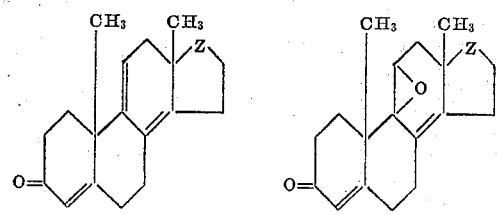

and the $\Delta^1$-, $\Delta^{1,6}$-, and $\Delta^6$-dehydro derivatives thereof wherein Z is selected from the group consisting of

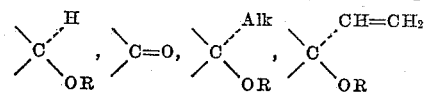

or

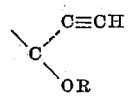

R is selected from the group consisting of hydrogen and acyl hydrocarbon containing up to ten carbon atoms and Alk is selected from the group consisting of alkyl groups containing up to three carbon atoms.

Suitable compounds for the preparation of the valuable compounds of this invention include those represented by the formula

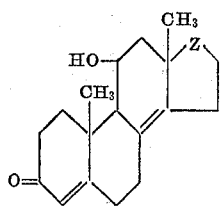

wherein Z has the same meaning as above. These compounds can be prepared from the known compound $\Delta^4$-androstene-11β-hydroxy-3,17-dione in accordance with the procedure fully described and illustrated in copending and concurrently filed patent application Serial No. 758,915. This application describes the preparation of these compounds from the corresponding 9β,11β-oxido-8(14)-dihydroandrostene derivatives by treatment with perchloric acid. The reaction is carried out in an alcohol-free hydrocarbon or halogenated hydrocarbon solvent such as petroleum ether, benzene, chlorobenzene, toluene, ethylene dichloride, chloroform or carbon tetrachloride at a temperature of from about 0° C. to about 10° C. during a period of from about 2 to about 25 minutes using at least an equivalent quantity of 60% perchloric acid. An excess of perchloric acid as high as 200% can be used to ensure complete reaction.

The desired product is isolated by diluting the reaction mixture with from 1 to 3 times its volume of ice cold water. The resulting aqueous mixture is extracted with a suitable solvent, for example, chloroform or a mixture of chloroform in ethyl acetate. The organic solution is dried over an anhydrous drying agent such as sodium or magnesium sulfate, the drying agent removed and the desired product isolated by evaporation of the solvent, preferably in vacuo. It may be purified by trituration with a 1:1 mixture of ethyl acetate in ether followed by recrystallization from ethyl acetate.

The $\Delta^{9(11)}$-compounds of this invention are prepared by dehydration of the above illustrated 11β-hydroxyl compound with, for example, p-toluensulfonic acid in refluxing benzene or preferably with methyl sulfonyl chloride in pyridine. In the preferred method, the starting compound is allowed to stand together with an excess of methyl sulfonyl chloride in pyridine at a low temperature, for example, —5 to +5° C. for a period of from about 16 to about 30 hours. The intermediate mesylate compound can be isolated or alternatively the reaction mixture can be refluxed preferably in an inert atmosphere such as nitrogen for a period of from about 1 to about 4 hours. The desired compound is isolated by evaporating the solvent in vacuo.

The $\Delta^{9(11)}$-compound of this invention is converted to a 9β,11β-oxide of this invention using the procedure of Fried and Sabo as described in the Journal of the American Chemical Society, vol. 79, page 1130. The compound is first converted to a bromohydrin using N-bromoacetamide and perchloric acid in peroxide-free dioxane. The bromohydrin, that is, the 9α-bromo-11β-hydroxyl compound is converted to a 9β,11β-oxide using an alkaline reagent such as potassium acetate.

In this procedure, the bromohydrin is refluxed for a period of from about 30 minutes to about 1 hour in a dioxane-absolute alcohol solution containing from about 500% to about 800% excess by weight of anhydrous potassium acetate. At the end of the reaction period the desired product is precipitated by the addition of water and isolated by filtration. It is often possible to obtain increased yields of product by concentrating the filtrate and isolating successive groups of product by filtration. The procedure is fully illustrated in the appended examples.

The above-described bromohydrin is claimed in copending and concurrently filed patent application Serial No. 758,919.

The $\Delta^6$-dehydro compound of this invention can be prepared from the above described compounds by application of the reactions set forth in earlier filed patent applications Serial No. 526,554, filed August 4, 1955, and Serial No. 633,538, filed January 10, 1957. These applications described the method for the introduction of double bonds at the 6(7)-position by dehydrogenation of a 3-keto-6-dihydro-$\Delta^4$-steroid compound with a quinone having an oxidation-reduction potential less than —0.5 at a temperature of between 70° C. and 190° C. in an inert organic solvent having a boiling point of at least about 70° C. These solvents include mono-nuclear aromatic hydrocarbons, mono-nuclear halogenated aromatic hydrocarbon solvents, oxygenated polar alicyclic organic solvents and oxygenated polar aliphatic organic solvents. Typical solvents include tertiary butanol, n-amyl alcohol, hexanol, isoamyl alcohol, heptanol-3, cyclohexanol, ortho-dichlorobenzene, xylene, tertiary amyl alcohol, secondary amyl alcohol, benzene, toluene, acetic acid, propionic acid, butyric acid, butyl acetate, amyl acetate, hexyl acetate, butyl propionate, propyl propionate and amyl propionate. The preparation of the valuable compounds of the instant invention using the process described in the earlier filed applications is more fully illustrated in the appended examples.

Various modifications at the $C_{17}$ position can be made by procedures well known in the art. For conversion of the 17-keto group to a 17-hydroxy group the 3-keto group is preferentially converted to a pyrrolidinyl derivative, the 17-keto group is then reduced with lithium aluminum hydride and the pyrrolidinyl group removed by refluxing in a sodium acetate-acetic acid buffered aqueous-methanol solution. This reaction is described in detail by Heyl and Herr in the Journal of the American Chemical Society, 75, page 1918 (1953). The vinyl group can be introduced at the $C_{17}$ position by treating the 17-ketone with acetylene in the presence of a potassium tert-alkoxide (for example, potassium tert-amyl alkoxide) and reducing the thus produced ethynyl group by catalytic hydrogenation. For the introduction of the vinyl group the 3-keto group should again be protected by a pyrrolidinyl group which is, of course, subsequently removed. The 17-keto group can be converted to a tertiary alcohol, that is, an alkyl and hydroxyl group can be introduced at the 17-position by treatment with an organo-metallic compound of the type RLi or RMgX wherein R is alkyl up to four and X is a halogen. For the introduction of the vinyl group or the reaction with an organo-metallic compound the 3-keto group should be protected by a pyrrolidinyl group as described above. A 17-hydroxyl group can be readily esterified with the usual esterifying agents if it is the hydroxyl group of a secondary alcohol. If it is the hydroxyl of a tertiary alcohol it can be esterified by refluxing in a liquid anhydride, for example, acetic or propionic anhydride or in the case of a solid anhydride by heating the compound at about 100° C. in a hydrocarbon solvent solution such as xylene containing the anhydride and catalytic amounts of potassium acetate. Esters and acid esters of the 17-hydroxyl group can be obtained in this manner. An 11β-hydroxyl group can be converted to a keto group by oxidation, for example, with chromic acid. If, however, there is a secondary hydroxyl group at the 17-position, it is best to acylate this group before oxidizing the group at the 11-position. As stated above, all of these reactions are conventional in the art.

Although the reactions described above are applicable to compounds in which the 17-position carries a free β-hydroxyl group, for optimum results it is best that this hydroxyl group be acylated with an acyl hydrocarbon group containing up to ten carbon atoms. The term "acyl hydrocarbon" includes acyl hydrocarbon groups containing only carbon, hydrogen and oxygen derived from mono-carboxylic or dicarboxylic acids. In the event that the acyl hydrocarbon group is one derived from a dicarboxylic acid, it is often advantageous to treat the isolated therapeutically active compounds with a base derived from an alkali metal or alkaline earth metal to prepare a metal salt. These bases include, for example, sodium, potassium, barium and calcium hydroxide as well as the corresponding carbonates and bicarbonates. Products so prepared are especially useful because of their increased solubility in water.

The following examples are given solely for the purpose of illustration and are not to be construed as limitations of this invention, many apparent variations of which are possible without departing from the spirit or scope thereof.

EXAMPLE I $\Delta^{4,8(14),9(11)}$-androstatriene-3,17-dione

A solution containing 3 ml. of pyridine and 0.59 ml. of methylsulfonylchloride, together with 240 mg. of $\Delta^{4,8(14)}$-androstadiene-11β-ol-3,17-dione was maintained at a temperature of 0° C. for 24 hours. At the end of this period a small amount of ice and water was added and the resulting mixture extracted with methyl acetate. The organic layer was separated and washed successively with equal volumes of water, 2 N hydrochloric acid and again with water. It was concentrated to dryness to leave the 11β-mesylate as a residue. The residue was dissolved in 3 ml. of pyridine and the solution refluxed in a nitrogen atmosphere for 2 hours. The resulting solution was extracted with ethyl acetate, the organic layer washed as described above and the desired product isolated by concentrating to dryness.

$\Delta^{4,6,8(14),9(11)}$-androstatetraene-3,17-dione
$\Delta^{1,4,8(14),9(11)}$-androstatetraene-3,17-dione
$\Delta^{1,4,6,8(14),9(11)}$-androstapentaene-3,17-dione
17α-methyl-$\Delta^{4,8(14),9(11)}$-androstatriene - 17β-ol-3-one 17-acetate
17α - methyl - $\Delta^{4,6,8(14),9(11)}$ - androstatetraene - 17β - ol-3-one 17-acetate
17α - methyl - $\Delta^{1,4,8(14),9(11)}$ - androstatetraene - 17β - ol-3-one 17-acetate
17α - methyl - $\Delta^{1,4,6,8(14),9(11)}$ - androstapentaene - 17β-ol-3-one 17-acetate
17α - ethyl - $\Delta^{4,8(14),9(11)}$ - androstatriene - 17β - ol - 3-one 17-acetate
17α - ethyl - $\Delta^{4,6,8(14),9(11)}$ - androstatetraene - 17β - ol-3-one 17-acetate
17α - ethyl - $\Delta^{1,4,8(14),9(11)}$ - androstatetraene - 17β - ol-3-one 17-acetate
17α - ethyl - $\Delta^{1,4,6,8(14),9(11)}$ - androstapentaene - 17β - ol-3-one 17-acetate
17α - propyl - $\Delta^{4,8(14),9(11)}$ - androstatriene - 17β - ol - 3-one 17-acetate
17α - propyl - $\Delta^{4,6,8(14),9(11)}$ - androstatetraene - 17β - ol-3-one 17-acetate
17α - propyl - $\Delta^{1,4,8(14),9(11)}$ - androstatetraene - 17β - ol-3-one 17 acetate
17α - propyl - $\Delta^{1,4,6,8(14),9(11)}$ - androstapentaene - 17β-ol-3-one 17-acetate
17α - ethynyl - $\Delta^{1,4,8(14),9(11)}$ - androstatetraene - 17β - ol-3-one 17-acetate
17α - ethynyl - $\Delta^{1,4,6,8(14),9(11)}$ - androstapentaene - 17-β-ol-3-one 17-acetate
17α - ethynyl - $\Delta^{4,8(14),9(11)}$ - androstatriene - 17β - ol - 3-one 17-acetate
17α - ethynyl - $\Delta^{4,6,8(14),9(11)}$ - androstatetraene - 17β - ol-3-one 17-acetate
17α - vinyl - $\Delta^{4,8(14),9(11)}$ - androstatriene - 17β - ol - 3-one 17-acetate
17α - vinyl - $\Delta^{4,6,8(14),9(11)}$ - androstatetraene - 17β - ol-3-one 17-acetate
17α - vinyl - $\Delta^{1,4,8(14),9(11)}$ - androstatetraene - 17β - ol-3-one 17-acetate
17α - vinyl - $\Delta^{1,4,6,8(14),9(11)}$ - androstapentaene - 17β - ol-3-one 17-acetate
$\Delta^{4,8(14),9(11)}$-androstatriene-17β-ol-3-one 17-acetate
$\Delta^{4,6,8(14),9(11)}$-androstatetraene-17β-ol-3-one 17-acetate
$\Delta^{1,4,8(14),9(11)}$-androstatetraene-17β-ol-3-one 17-acetate
$\Delta^{1,4,6,8(14),9(11)}$-androstapentaene-17β-ol-3-one 17-acetate The above compounds were each prepared using the procedure of Example I.

EXAMPLE II $9\alpha$-bromo-$\Delta^{4,8(14)}$-androstadiene-11β-ol-3,17-dione To a suspension of $\Delta^{4,8(14),9(11)}$-androstatriene-3,17-dione, prepared as described in the above example, (2.4 g.) in pure peroxide free dioxane (20 ml.) and 3.65 ml. of 0.46 N perchloric acid was added in the dark at room temperature with stirring for a one hour period 1.14 g. of N-bromoacetamide. At the end of two hours all of the starting material had dissolved and 2.5 ml. of sodium sulfite solution was added with stirring. A few grams of ice in 20 ml. of chloroform was added and the layers separated. The organic layer was washed twice with water while maintaining the temperature at about 20° C. by the occasional addition of ice. The organic solution was concentrated in vacuo and triturated in acetone. The mixture was maintained at a temperature of about 5° C. and the desired product recovered by filtration.

Using this procedure each of the compounds in the list given with Example I were converted to the corresponding 9α-bromo-11β-hydroxy steroids.

EXAMPLE III

*9β-11β-oxido-Δ$^{4,8(14)}$-androstadiene-3,17-dione*

A solution of 2.3 g. of the compound prepared in the previous example in 75 ml. of dioxane was added to a solution of 15.8 g. of anhydrous potassium acetate in 160 ml. of absolute alcohol at a temperature just below the reflux temperature of the alcohol solution. The mixture was brought to reflux within three minutes and the reaction allowed to proceed for a total of forty minutes. After cooling in an ice bath, 400 ml. of ice water was added with stirring and the desired product precipitated. Successive crops of the desired product were obtained by concentrating the mother liquor.

Using the procedure of this example the following compounds were prepared.

9β,11β - oxido - Δ$^{4,8(14)}$-androstadiene - 3,17 - dione
9β,11β - oxido - Δ$^{4,6,8(14)}$ - androstatriene - 3,17 - dione
9β,11β - oxido - Δ$^{1,4,8(14)}$ - androstatriene - 3,17- dione
9β,11β - oxido - Δ$^{1,4,6,8(14)}$ - androstatetraene - 3,17 - dione
9β,11β - oxido - 17α - methyl - Δ$^{4,8(14)}$ - androstadiene - 17β - ol - 3 - one 17 - acetate
9β,11β - oxido - 17α - methyl - Δ$^{4,6,8(14)}$ - androstatriene- 17β - ol - 3 - one 17 - acetate
9β,11β - oxido - 17α - methyl - Δ$^{1,4,8(14)}$ - androstatriene- 17β - ol - 3 - one 17 - acetate
9β,11β - oxido - 17α - methyl - Δ$^{1,4,6,8(14)}$ - androstatetraene - 17β - ol - 3 - one 17 - acetate
9β,11β - oxido - 17α - ethyl - Δ$^{4,8(14)}$ - androstadiene- 17β - ol - 3 - one 17 - acetate
9β,11β - oxido - 17α - ethyl - Δ$^{4,6,8(14)}$ - androstatriene- 17β - ol - 3 - one 17 - acetate
9β,11β - oxido - 17α - ethyl - Δ$^{1,4,8(14)}$ - androstatriene- 17β - ol - 3 - one 17 - acetate
9β,11β - oxido - 17α - ethyl - Δ$^{1,4,6,8(14)}$ - androstatetraene- 17β - ol - 3 - one 17 - acetate
9β,11β - oxido - 17α - propyl - Δ$^{4,8(14)}$ - androstadiene- 17β - ol - 3 - one 17 - acetate
9β,11β - oxido - 17α - propyl - Δ$^{4,6,8(14)}$ - androstatriene- 17β - ol - 3 - one 17 - acetate
9β,11β - oxido - 17α - propyl - Δ$^{1,4,8(14)}$ - androstatriene- 17β - ol - 3 - one 17 - acetate
9β,11β - oxido - 17α - propyl - Δ$^{1,4,6,8(14)}$ - androstatetraene - 17β - ol - 3 - one 17 - acetate
9β,11β - oxido - 17α - ethynyl - Δ$^{4,8(14)}$ - androstadiene- 17β - ol - 3 - one 17 - acetate
9β,11β - oxido - 17α - ethynyl - Δ$^{4,6,8(14)}$ - androstatriene- 17β - ol - 3 - one 17 - acetate
9β,11β - oxido - 17α - ethynyl - Δ$^{1,4,8(14)}$ - androstatriene- 17β - ol - 3 - one 17 - acetate
9β,11β - oxido - 17α - ethynyl - Δ$^{1,4,6,8(14)}$ - androstatetraene - 17β - ol - 3 - one 17 - acetate
9β,11β - oxido - 17α - vinyl - Δ$^{4,8(14)}$ - androstadiene- 17β - ol - 3 - one 17 - acetate
9β,11β - oxido - 17α - vinyl - Δ$^{4,6,8(14)}$ - androstatriene- 17β - ol - 3 - one 17 - acetate
9β,11β - oxido - 17α - vinyl - Δ$^{1,4,8(14)}$ - androstatriene- 17β - ol - 3 - one 17 - acetate
9β,11β - oxido - 17α - vinyl - Δ$^{1,4,6,8(14)}$ - androstatetraene- 17β - ol - 3 - one 17 - acetate
9β,11β - oxido - Δ$^{4,8(14)}$ - androstadiene - 17β - ol - 3 -one 17 - acetate
9β,11β - oxido - Δ$^{4,6,8(14)}$ - androstatriene - 17β - ol - 3 -one 17 - acetate
9β,11β - oxido - Δ$^{1,4,8(14)}$ - androstatriene - 17β - ol - 3 -one 17 - acetate
9β,11β - oxido - Δ$^{1,4,6,8(14)}$ - androstapentaene - 17β - ol- 3 - one 17 - acetate

EXAMPLE IV

The 17-acetates prepared as described above are all converted to free alcohols by alkaline hydrolysis using conventional procedures.

EXAMPLE V

A variety of 17-esters of the free alcohols prepared as described in the previous examples were each prepared by acylation using conventional methods. The compounds prepared include formates, propanoates, propenoates, isobutyrates, hexanoates, benzonoates, octanoates, decanoates, hemisuccinates, trimethyl acetates, cyclopentylpropionates, etc. The acid esters of dicarboxylic acids such as the hemisuccinate have the advantage that alkali metal salts and alkaline earth metal salts can be prepared from them by treatment with molar proportions of a base such as sodium or potassium bicarbonate or barium hydroxide. These salts are water soluble, an advantage not possessed by the free alcohols themselves or by ordinary esters thereof.

What is claimed is:

1. A compound selected from the group consisting of those having the formulas:

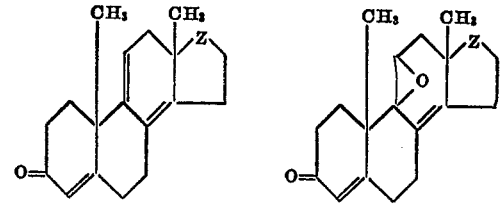

and the Δ$^1$-, Δ$^{1,6}$- and Δ$^6$-dehydro derivatives thereof wherein Z is selected from the group consisting of

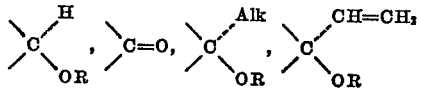

or

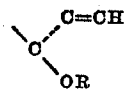

R is selected from the group consisting of hydrogen and acyl hydrocarbon containing up to ten carbon atoms and Alk is selected from the group consisting of alkyl groups containing up to three carbon atoms.

2. Δ$^{4,8(14),9(11)}$-androstatriene-3,17-dione.
3. Δ$^{4,6,8(14),9(11)}$-androstatetraene-3,17-dione.
4. Δ$^{1,4,8(14),9(11)}$-androstatetraene-3,17-dione.
5. 9β,11β-oxido-Δ$^{4,8(14)}$-androstadiene-3,17-dione.
6. 9β,11β-oxido-Δ$^{4,6,8(14)}$-androstatriene-3,17-dione.
7. 9β,11β-oxido-Δ$^{1,4,8(14)}$-androstatriene-3,17-dione.

No references cited.